United States Patent [19]
Kassab

[11] Patent Number: 5,687,036
[45] Date of Patent: Nov. 11, 1997

[54] SELECTION OF OPTIMUM WRITE CURRENT IN A DISC DRIVE TO MINIMIZE THE OCCURRENCE OF REPEATABLE READ ERRORS

[75] Inventor: Roger Jean Kassab, Oklahoma City, Okla.

[73] Assignee: Seagate Technology, Inc., Scotts Valley, Calif.

[21] Appl. No.: 536,958

[22] Filed: Sep. 29, 1995

[51] Int. Cl.$^6$ .............................. G11B 5/09; G11B 27/36; G06F 11/00
[52] U.S. Cl. ................... 360/53; 360/31; 360/46; 371/5.1
[58] Field of Search ..................... 360/27, 31, 46, 360/53, 65; 369/53; 371/5.1

[56] References Cited

U.S. PATENT DOCUMENTS

| | | | |
|---|---|---|---|
| 4,821,125 | 4/1989 | Christensen et al. | 360/31 |
| 5,408,367 | 4/1995 | Emo | 360/27 |
| 5,530,705 | 6/1996 | Malone, Sr. | 371/5.1 |

Primary Examiner—Aristotelis M. Psitos
Assistant Examiner—Regina Y. Neal
Attorney, Agent, or Firm—Bill D. McCarthy; Edward P. Heller, III; Randall K. McCarthy

[57] ABSTRACT

A method for optimizing the write current used by a disc drive read/write transducer to write data to data tracks on a disc. The method optimizes the write current by selecting write currents that minimize the occurrence of repeatable, hard read errors. The method comprises writing a predetermined pattern of information to selected data tracks using each of a plurality of write current values and subsequently reading the data on the selected data track while recording the number of hard read errors for each of the write current values. The optimum write current value is selected at the write current value having the minimum number of hard read errors. An optimum write current value is determined for each of a plurality of locations on the disc and these write current values are stored in the disc drive. During subsequent disc drive write operations, these values are used to determine the optimum write current value for a selected data track through interpolation techniques. Alternatively, for disc drives employing zone-based recording, an optimum write current value can be determined and used for each zone of data tracks on the disc.

10 Claims, 3 Drawing Sheets

SELECTION OF OPTIMUM WRITE CURRENT IN A DISC DRIVE TO MINIMIZE THE OCCURRENCE OF REPEATABLE READ ERRORS

BACKGROUND OF THE INVENTION

1. Field of the Invention

This invention relates generally to the field of disc drive data storage devices, and more particularly, but not by way of limitation, to a method for optimizing write current in a disc drive.

2. Discussion

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted for movement to an electronically controlled actuator mechanism.

Presently, the most commonly used type of actuator mechanism is the rotary voice coil actuator, which employs a voice coil motor. With this type of actuator, the heads used to write and read data are mounted via flexures at the ends a plurality of arms which project radially outward from a substantially cylindrical actuator body. The actuator body is journaled via ball bearing assemblies to rotate about a pivot shaft which is mounted to the disc drive housing at a position closely adjacent the outer extreme of the discs. The pivot shaft is parallel with the axis of rotation of the spindle motor and the discs and the heads move in a plane parallel with the surfaces of the discs.

The actuator voice coil motor includes a coil mounted on the side of the actuator body opposite the head arms so as to be immersed in the magnetic field of an army of permanent magnets. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disc surfaces.

Typically, the heads are supported over the discs by slider assemblies which include air-bearing surfaces designed to interact with a thin layer of moving air generated by the rotation of the discs, so that the heads are said to "fly" over the disc surfaces. It is known that the write current supplied to a head during a write operation is typically varied with respect to the relative position of the head to the disc surface; more particularly, factors such as changes in the linear velocity of the disc with respect to disc radius, the skew of the slider with respect to the disc, the throat height of the head and general head/media tolerances inherent in high volume disc drive manufacturing processes result in the write current being controllably varied as the head is positioned radially across the disc surface.

It will further be recognized that the optimal write current level used in a write operation should desirably minimize the read errors when data is subsequently read back from the disc during a read operation. Although disc drives typically incorporate error correction code (ECC) circuitry and associated algorithms in order to reduce the effects of such read errors, as data densities and transfer rates continually increase, such ECC techniques are liwrited as to the number of errors that can be reliably and efficiently detected and corrected by a disc drive read channel. It is therefore desirable to not only continue to employ sophisticated ECC methods in disc drives, but to also minimize the occurrence of read errors in the first place, including through the selection of appropriate write current levels.

One prior art approach to optimizing write current and read voltage levels is disclosed in U.S. Pat. No. 4,821,125 entitled COMPENSATION OF WRITE CURRENT AND DELTA-V FOR RECORDING COMPONENT AND RADIAL POSITION, issued Apr. 11, 1989 to Christensen et al. (hereinafter "Christensen '125"), which seeks to selectively optimize write currents at locations across a disc surface based upon the total number of read errors that occur for various write current levels and readback thresholds. More particularly, this approach involves an incremental adjustment of the write current level, the read voltage threshold level, or both, based upon the changing number of read errors encountered during subsequent test read operations in comparison to predetermined acceptance thresholds. While Christensen '125 recognizes the desirability of using read error information in selecting write current levels (and read voltage thresholds), the reference requires a relatively highly iterative and time intensive process flow and only optimizes write currents for disc drives exhibiting total read error rates higher than predetermined total error rate It will be recognized by those skilled in the art that read errors may be classified as "hard" errors and "soft" errors (also sometimes referred to herein as "hard read errors" and "soft read errors," respectively), with hard errors being repeatable each time the data containing the error is read and soft errors being non-repeatable errors during a read operation. It will further be recognized that hard errors are often induced by localized media anomalies, including contamination and variations in media thickness and composition sufficient to variably affect the ability of the media to be selectively magnetized by the head. Such variations in media performance can be somewhat overcome by increasing the magnitude of the write current, but the magnitude of the write current cannot be increased indefinitely without inducing additional hard read errors in neighboring tracks as the data is written to the selected data track, due to magnetic fringing effects. Similarly, soft errors are generally induced by the performance of the read head in combination with the read channel and associated data processing circuitry operation, as well as systemic noise. Although a total read error rate is determined by the combination of both the hard and soft error rates, clearly the minimization of hard errors is of paramount importance in the selection of an optimum write current insofar as the ability of the write current to reduce the hard error rate is concerned. There is a need, therefore, for an improved approach to optimizing hard error rates in a disc drive that minimizes the occurrence of hard errors during data read operations.

SUMMARY OF THE INVENTION

The present invention provides a method for optimizing the write current in a disc drive. More particularly, the method optimizes the write current used by a disc drive read/write transducer to write data to data tracks on a disc, by selecting write currents that minimize the occurrence of repeatable, hard read errors.

The method comprises writing a predetermined pattern of information to selected data tracks using each of a plurality of write current values and subsequently reading the data on the selected data track while recording the number of hard read errors for each of the write current values. The optimum write current value is selected at the write current value having the minimum number of hard read errors. An optimum write current value is determined for each of a plurality of locations on the disc and these write current values are stored in the disc drive.

During subsequent disc drive write operations, these values are used to determine the optimum write current value for a selected data track through interpolation techniques. Alternatively, for disc drives employing zone-based recording, an optimum write current value can be determined and used for each zone of data tracks on the disc.

An object of the present invention is to provide a method for optimizing the write current in a disc drive for use during data write operations.

Another object of the present invention, while achieving the above stated object, is to optimize the write current for each head-disc combination so as to minimize the occurrence of hard read errors during subsequent read operations.

Still another object of the present invention, while achieving the above stated objects, is to provide write current values for multiple locations on a disc drive which are subsequently used to determine the optimum write current value to write data to a selected data track on a disc.

Yet another object of the present invention, while achieving the above stated objects, is to provide a method that may be performed either during a disc drive manufacturing process, or during the life of the disc drive.

Other objects, advantages and features of the present invention will be apparent from the following description when read in conjunction with the drawings and appended claims.

DESCRIPTION

Figure 1:
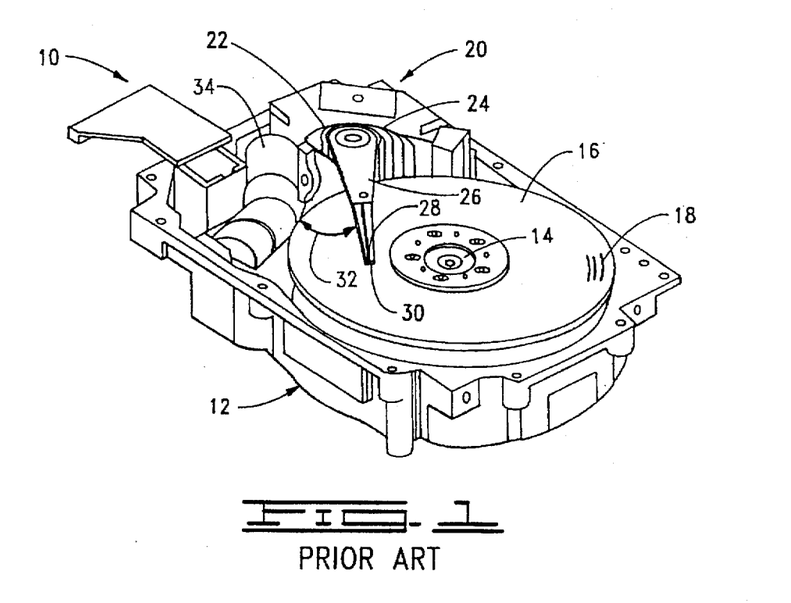
FIG. 1 is a perspective view of a disc drive in which the present invention is particularly useful.

Turning now to the drawings and more particularly to FIG. 1, shown is a perspective view of a disc drive 10 of the type in which the present invention is particularly useful. The disc drive 10 includes a housing base 12 and a top cover (not shown) which cooperatively engage to form a sealed housing which serves to protect delicate internal components from external contaminants.

A plurality of discs 16 are mounted for rotation on a spindle motor hub 14. An array of heads (one shown at 30) is mounted via head arms 26 to an actuator body 22 which is adapted for pivotal motion about a pivot shaft 24 under control of a voice coil motor, shown generally at 20.

The voice coil motor (VCM) 20 is driven by electronic circuitry (not shown in FIG. 1) to controllably move the heads 30 to any desired one of a plurality of concentric circular tracks 18 on the discs 16 along arcuate path 32. Signals used to control the VCM 20, as well as signals to and from the heads 30, are passed via a flex circuit 34.

Figure 2:
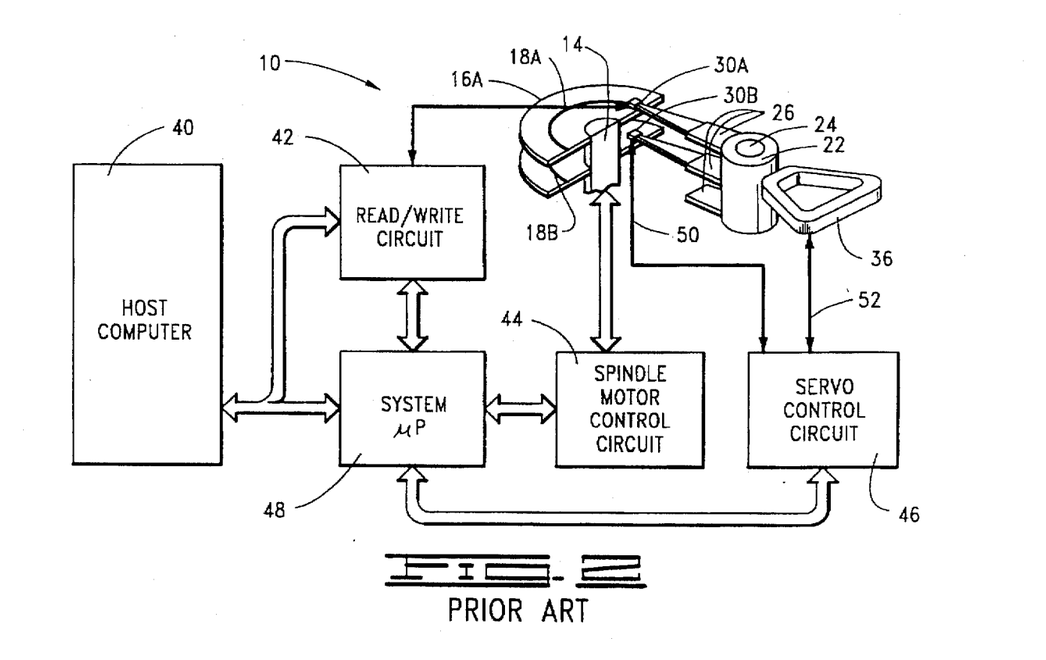
FIG. 2 is a functional block diagram of the disc drive of FIG. 1.

Referring to FIG. 2, shown therein is a simplified functional block diagram of the disc drive 10 of FIG. 1, operably connected to a host computer 40. More particularly, FIG. 2 shows the disc drive 10 to comprise a read/write circuit 42, a spindle motor control circuit 44 and a servo control circuit 46, all operably connected to and controlled by a system microprocessor 48. The function and construction of each of these circuits will be discussed in turn, as follows.

Beginning with the spindle motor control circuit 44, it will be recognized that this conventional circuit functions to control and maintain the rotational speed of the discs 16 during normal disc drive operation. It is typical for disc drives to use brushless dc motors that are commutated using back emf sensing in order to maintain rotation of the discs 16 at a constant operational speed. For reference, such spindle motor control circuits are discussed in more detail in co-pending U.S. patent application Ser. No. 08/524,342, now U.S. Pat. No. 5,631,999, entitled ADAPTIVE COMPENSATION FOR HARD DISC DRIVE SPINDLE MOTOR MANUFACTURING TOLERANCE, filed Sep. 6, 1995 by Stanley H. Dinsmore, assigned to the assignee of the present invention and incorporated herein by reference.

Likewise, the servo control circuit 46 of FIG. 2 is used to maintain the relative position of heads 30A, 30B with respect to tracks 18A, 18B on discs 16A, 16B, whether during seeking, writing or reading operations. More particularly, the servo control circuit obtains servo position error information (SPE) on signal path 50 from the head 30B, and in response to this SPE information provides a correction signal on signal path 52 to a coil 36 of the VCM 20 in order to correct the position of the heads 30A, 30B. Additionally, at such times that the system microprocessor indicates that a seek is to be performed, the spindle motor control circuit 44 provides the appropriate current profile on signal path 52 to move the coil 36, and thus the heads 30A, 30B to the desired tracks 18A, 18B. As is well understood, such servo control circuits may be implemented using either dedicated or embedded servo systems, and it will be recognized that the present invention does not depend on the implementation of a particular servo scheme. For more discussion regarding the construction and operation of a typical servo control circuit, see U.S. Pat. No. 5,262,907 entitled HARD DISC DRIVE WITH IMPROVED SERVO SYSTEM, issued Nov. 16, 1993 to Duffy, McKenzie, Heydari and Woods, assigned to the assignee of the present invention and incorporated herein by reference. It will thus be recognized that the cooperative operation of both the spindle motor control circuit 44 and the servo control circuit 46 cause the heads 30A, 30B to be positioned over a desired portion of the data tracks 18A, 18B in order to facilitate the reading and writing of data to the discs.

The third functional block of the disc drive 10 identified in FIG. 2 is the read/write circuit 42. It will be recognized that the function of this circuit is to write information to the data tracks 18A, 18B and to subsequently read the information that has been previously written. Such read/write circuits are well known in the art, but to provide additional clarity concerning the preferred embodiment of the present invention, FIG. 3 shows a simplified block diagram of the read/write circuit 42.

Figure 3:
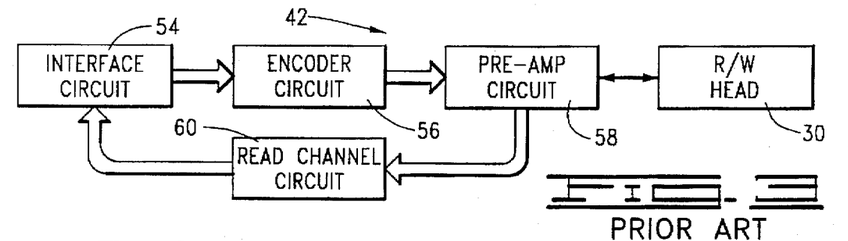
FIG. 3 is a functional block diagram of the read/write circuit of FIG. 2.

More particularly, FIG. 3 shows the read/write circuit 42 to comprise an interface circuit 54 for controlling the passage of data to and from the host computer 40 of FIG. 2.

In the preferred embodiment, the interface circuit 54 includes a conventional SCSI controller with a buffer and error correction code (ECC) circuitry. Data to be written to the discs 16 is provided by the interface circuit 54 to an encoder circuit 56, which provides run-length liwrited encoded data to a pre-amp circuit 58, where the data is serialized and provided as a series of pulses to the read/write head 30. The pre-amp circuit 58 includes a write driver (not shown) that provides a write current at a predetermined value and polarity in order to write the data to the disc 16. During a read operation, the data magnetically stored on the disc is sensed by the read/write head 30 and passed to the pre-amp circuit 58, through a read channel 60, and back to the buffer of the interface circuit 54. For reference, additional discussion concerning the operation of a typical read/write circuit is provided in U.S. Pat. No. 5,107,378 entitled ADAPTIVE MAGNETIC RECORDING AND READBACK SYSTEM, issued Apr. 21, 1992 to Cronch and Stone, as well as U.S. Pat. No. 5,047,876 entitled ADAPTIVE PREWRITE COMPENSATION APPARATUS, issued Sep. 10, 1991 to Holsinger, Genheimer and both of these references being assigned to the assignee of the present application and incorporated herein by reference. More particularly, the Cronch et al. reference U.S. Pat. No. 5,107,378 describes in detail a method for identifying an optimal write current for a selected data track on a disc by providing boundary write current values at both the inner and outer diameters of the disc and then performing an interpolation step on these values in order to obtain the optimal write current value for the selected data track.

Having now concluded an overview of the disc drive 10 and the construction and operation of the read/write circuit 42, the present discussion will now turn to the preferred embodiment of the present invention which optimizes a disc drive write current so as to minimize the read error rates observed in the disc drive. More particularly, during manufacturing testing, test data is written to the disc drive at a first write current level and then subsequently read and compared to the data initially written to characterize both the hard error rates as well as the soft error rates for that write current level. This testing is repeated using additional write current levels, so that error rates are obtained for each of the write current levels.

The optimum write current level is chosen to be that write current level having the minimum hard error rate among the samples tested. Where multiple write current levels have the same minimum hard error rate, the optimum write current level is chosen to be that write current level having both the minimum hard error rate and soft error rate. In the preferred embodiment, this testing is performed so that optimum write current levels are identified for each head at a zone of tracks located at the innermost diameter of the discs as well as at a zone of tracks located at the outermost diameter of the discs. These optimum write current levels are then stored digitally by the disc drive on a guardband of a disc and retrieved during disc drive operation. To determine the optimum write current for use by a particular head at a particular track, the system microprocessor interpolates between the two stored write current levels to arrive at the optimum write current for a write operation by the head, such as taught by the previously incorporated Cronch et at. reference U.S. Pat. No. 5,107,378.

Figure 4:
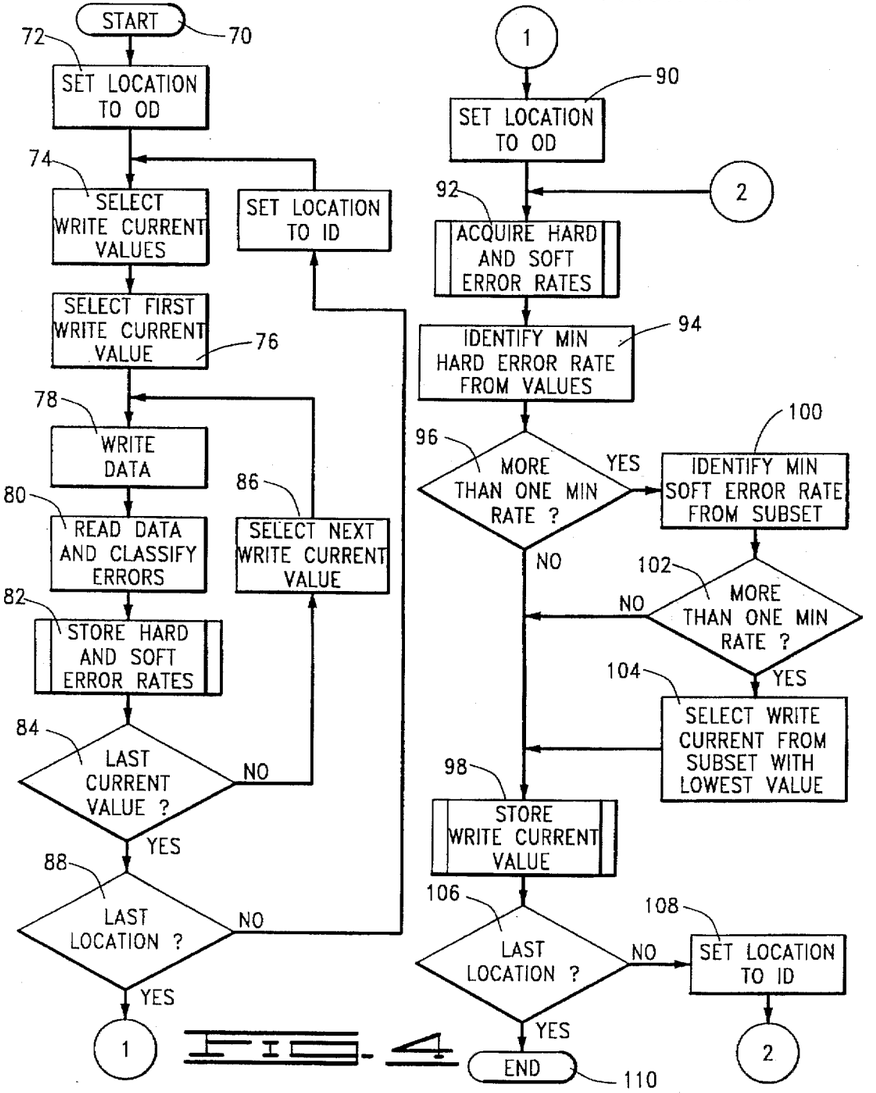
FIG. 4 is a flow diagram showing the steps performed in accordance with the present invention.

Referring now to FIG. 4, shown therein is a flow diagram showing the steps performed in accordance with the preferred embodiment of the present invention. More particularly, the steps of FIG. 4 are contemplated as being performed during dynamic burn-in, a manufacturing test operation in which the disc drives are operated over an extended period of time while being subjected to a variety of environmental and operational conditions in order to identify early life failures within the drive. It will be recognized, of course, that the steps of FIG. 4 can be performed at times other than during dynamic burn-in.

FIG. 4 shows the sequence of steps as beginning at a START block 70, after which the location to begin testing is set at the outer diameter (OD) in block 72. More particularly, the test is first set up to begin for a selected head-disc combination at the outermost zone on the disc. The flow continues to block 74, wherein a plurality of write current values is selected. In the preferred embodiment, a total of seven write currents having values of from about 14 mA to about 29 mA (peak-to-peak) are identified; the particular values and range of values chosen, of course, depend upon the particular construction of the disc drive. It will be recognized, however, that it will be generally desirable to choose the range of write current values where possible so as to provide both relatively "weak" write currents as well as relatively "strong" write currents, so as to provide a greater amount of flexibility in selecting the optimum write current for each head-disc combination.

Continuing with the flow of FIG. 4, the next step is provided at block 76, wherein the first of the write current values from block 74 is selected. The selection of the order of the write current values identified in block 74 is generally not important, but it may be desirable for data tracking and manipulation purposes to begin with the lowest identified write current value. Once the fast write current value is selected in block 76, the flow continues to block 78, wherein test data is written to the disc at the selected location using the first write current value. In the preferred embodiment, the test data is provided by the host computer and comprises a series of ten different test patterns designed to cover a variety of real-world data conditions. The data is written to all the tracks in the outermost zone, which in the preferred embodiment is 100 data tracks. It should be noted that the exact data provided to be written to every sector of every track is known and maintained.

After the test data has been written, the flow continues to block 80, wherein the previously written data is now read. With reference to FIG. 3, this data is provided by way of the read channel 60 to the buffer of the interface circuit 54, where the read data is compared byte-by-byte with the data that was written. It will be recognize that it is desirable to disable the operation of the ECC circuitry of the interface circuit 54 during this testing as the object of the test is to compare the data as retrieved to the data that was provided to be written, without the ECC circuitry modifying (correcting) read errors in the data read from the disc. The comparison operation between the written and subsequently read data may be performed in a variety of ways, including the porting of the read data to the host computer for comparison or the placement of the read data in a read buffer and the data provided to be written in a write buffer of the interface circuitry 54 with subsequent comparison between the two sets of data. In any case, the data is read from the disc and compared to the data written to the disc using well known data comparison techniques and the number and location of read errors is determined, as provided by block 80.

Upon the detection of a read error, indicating that a byte read from the disc differs from the data written to the disc, it is contemplated that the operation of block 80 causes that particular portion of data to be reread and again compared to the data written to the disc. This will determine whether the read error is a "hard" error, that is, whether the error is subsequently repeated when the data is reread, or a "soft" error, so that the error is not present when the data is reread. As provided hereinabove, the sum total of hard and soft errors divided by the total data read gives the total error rate, but a total error rate comprising a larger percentage of soft errors is generally more desirable than a total error rate comprising a lesser percentage of soft errors. Once the total number of hard and soft errors are determined, the hard and soft error rates are calculated and stored, as provided by block 82.

The process flow continues to decision block 84, which queries whether this is the last of the write current values identified in block 74; if not, the next write current value is selected by block 86 and the process flow returns to block 78, where the test data is rewritten using this new write current value. Thus, blocks 78 through 86 comprise a loop in the process flow during which the hard and soft error rates are calculated for each of the write current levels, respectively.

At such time that the last write current level has been used, the decision block 84 passes program flow to decision block 88, which queries whether this is the last location on the disc to be tested. As provided hereinabove, the flow of FIG. 4 contemplates the preferred embodiment of the present invention to comprise testing at two locations, the outer diameter and the inner diameter on the disc. However, it will be recognized that the testing could continue for any number of locations on the disc, including each zone of the disc for disc chives employing the use of zone-based recording, such as disclosed in U.S. Pat. No. 4,799,112 entitled METHOD AND APPARATUS FOR RECORDING DATA, issued Jan. 17, 1989 to Bremmer, Kovner and Stone, assigned to the assignee of the present invention and incorporated herein by reference. When all the locations on the disc drive have been tested, the decision block 88 passes program flow (as denoted by the flow marker "1") to block 90, SET LOCATION TO OD.

Block 90 and the remaining portions of the flow of FIG. 4 describe the steps necessary to select the appropriate write current value levels, based upon the error rates determined by the first part of the process flow. Block 90 sets the location to the outer diameter (OD), after which the hard and soft error rates for the OD (determined by block 80 and stored by block 82) are retrieved by block 92 and provided to block 94, wherein the write current value level having the minimum hard error rate is identified. By way of example, as provided hereinabove seven write current values were identified by block 74 and a hard error rate was determined for each of these seven write current values by block 80; block 94 thus operates to compare the seven hard error rates and identify the write current value associated with the minimum hard error rate.

If only one write current value is found to have the minimum hard error rate, then this value is selected as the optimum write current value. Accordingly, decision block 96 passes program flow to block 98, wherein this optimum write current value is stored. On the other hand, for the case where two or more write current levels for this location produce a minimum number of hard errors (whether zero errors or the same number of errors within the resolution capability of the system), the decision block 96 passes the flow to block 100, where the soft error rates are compared for this subset of write current values. That is, the soft error rates of those write current values having minimum hard error rates are compared and the write current value having both the minimum hard and soft error rates is subsequently stored by block 98, as shown by decision block 102. However, at such time that two or more write current values have both the minimum hard and soft error rates, then process flow continues from decision block 102 to block 104, wherein the optimum write current from these values is chosen. The criteria for choosing the optimum write current from these values can vary as desired; for instance, the lowest current value may be chosen, or the value closest to the optimum value for other locations may be chosen. It will be noted that, in such a case where a plurality of write currents provide the same minimum numbers of hard and soft error rates, the disc drive may be described as being relatively robust, so that the particular write current selected from these values will not be of great significance in terms of the overall performance of the disc drive and that other factors may be used to determine the optimum write current from among these values in such a case.

Continuing with the flow of FIG. 4, after the optimum write current value for the OD is stored by block 98, the flow continues to decision block 106, which passes process flow to block 108, SET LOCATION TO ID, after the first pass through the steps described by blocks 90 to 106. At block 108 the second location, namely the inner diameter (ID), is identified and process flow returns (by way of flow marker "2") to block 92, wherein the same steps as provided hereinabove for the OD are now performed at the ID so that an optimum write current value is identified for the ID. Once this is completed, the process flow at decision block 106 ends as denoted by END block 110.

It will be recognized that, once the optimum write current values have been identified and stored by the flow of FIG. 4, the disc drive will thereafter utilize these values in determining the proper write current level during a write operation. More particularly, after the disc drive has been powered up, these values will be read from disc drive non-volatile memory (generally a guardband on a disc surface that is not accessible for normal data related operations) and placed into system RAM. Upon the receipt of a write command, the system microprocessor (48 in FIG. 2) will interpolate between the write current values to determine the optimum write current value for that track to which data will be written.

Figure 5:
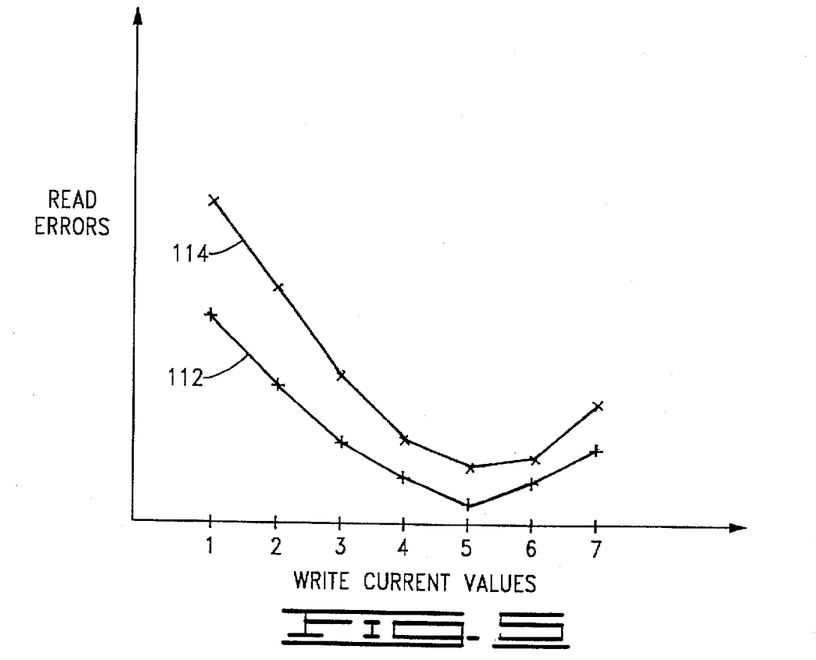
FIG. 5 is a graphical representation of hard error and total error rates obtained from the method of FIG. 4 for a plurality of different write currents.

To further illustrate the steps described above with reference to FIG. 4, FIGS. 5 and 6 have been provided which show graphical representations of the number of hard and soft errors obtained for a plurality of different write current values. Referring first to FIG. 5, shown therein is an x-y graph with seven different write current values represented on the x-axis and read errors represented by the y-axis. As this is a graphical representation for purposes of illustration, actual values of write current and read errors are not shown, but rather it will be understood that the seven write current values (denoted in FIG. 5 as 1-7) are different write current values selected in block 74 of FIG. 4, with write current value 1 being the lowest value and write current value 7 being the highest value. Likewise, the y-axis is labeled as showing read errors and it will be readily understood that the raw number of read errors obtained during the flow of FIG. 4 may be used without normalizing them through conversion to read error rates, as previously described, provided the total number of data bytes read during the testing remains generally consistent for each of the write current values.

The curve 112 in FIG. 5 represents the number of hard errors obtained for each of the write current values 1-7, with the discrete number of hard errors plotted above each of the write current values (as denoted in the figure by "+" markers). The lines joining adjacent markers are not necessary for the analysis, but do serve to facilitate the present discussion. Likewise, the curve 114 of FIG. 5 represents the total number of read errors for each of the write current values 1–7 (as denoted in the figure by "x" markers). The number of soft errors can readily be observed as being the difference between the two curves 112 and 114.

As shown in FIG. 5, the write current value 5 produced the minimum number of read errors among the write current values 1–7, and so on this basis, the flow of FIG. 4 would lead to the selection of the write current value 5 as being the optimum value for this particular location. It is important to note that the adjacent write current values 4 and 6 produced a greater number of hard errors than the write current value 5. Of course, it will be recognized that, as the curves 112 and 114 are not continuous, there could be a write current value between either write current values 4 and 5 or write current values 5 and 6 which would produce even fewer read errors than by the write current value 5. It is explicitly contemplated that either mathematical analysis of the curve 112 or additional iterative testing in accordance with FIG. 4 could be subsequently performed to further optimize the write current and select a value between either write current values 4 and 5 or between write current values 5 and 6. However, in the preferred embodiment, such additional optimization is not performed, essentially for economic reasons.

Figure 6:
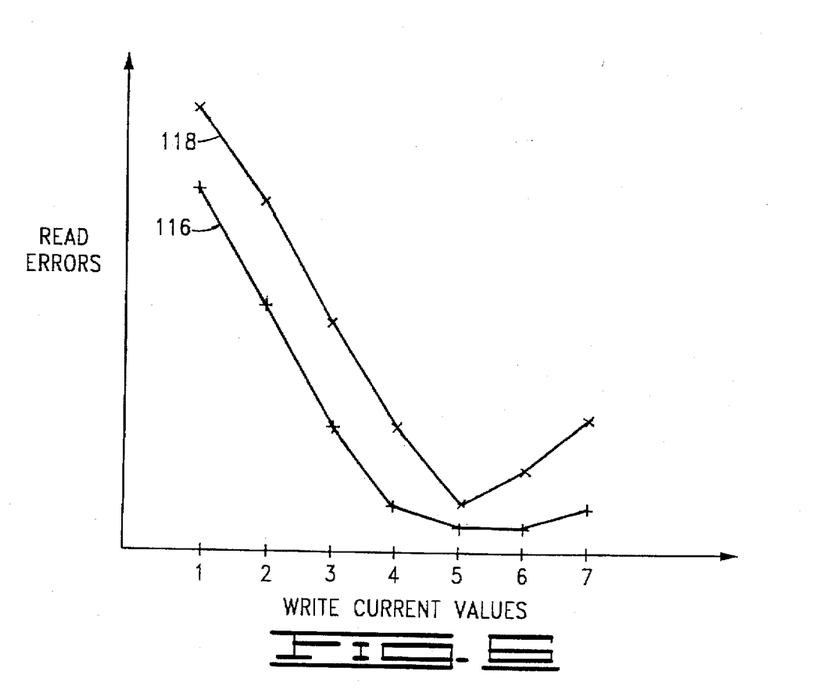
FIG. 6 is another graphical representation of hard error and total error rates obtained from the method of FIG. 4 for a plurality of different write currents.

Referring now to FIG. 6, shown therein are the same types of graphical representations as provided in FIG. 5; more particularly, FIG. 6 includes curves 116 and 118, with curve 116 representing the hard errors and curve 118 representing the total read errors produced by the flow of FIG. 4 for a particular head-disc combination at a particular location. As shown in FIG. 6, however, both write current values 5 and 6 both exhibit the same minimum number of hard errors, although current value 6 exhibited a higher number of total read errors, indicating more soft errors occurred with the write current value 6 than with the write current value 5. Thus, in accordance with the foregoing discussion regarding FIG. 4, the write current value 5 would be selected as the optimal write current value in this case as well.

Although in the preferred embodiment of the present invention, such graphical representations as provided in FIGS. 5 and 6 are not explicitly generated, it is contemplated that such graphs could be generated as desired for review by an operator, either during the selection of the optimum write current or during diagnostic analysis of a particular disc drive.

Additionally, it will be recognized that the flow of FIG. 4 can be implemented in software resident either in the host computer or in firmware of the disc drive, or both, and that the operation of the steps described hereinabove for optimizing write current in a disc drive can occur not only during manufacturing, but also during the life of the drive, to compensate for changed operational conditions of the drive in the field.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive having a rotatable disc and an actuator adjacent the disc, the actuator including a read/write transducer for initially writing data to a selected track on the disc by utilizing a write current to selectively magnetize the track during a write operation, the read/write transducer subsequently generating a read signal by detecting the selective magnetization of the track during a read operation, the disc drive further including a read channel for recovering the initially written data from the read signal, a method for optimizing disc drive write performance comprising the steps of:

writing a predetermined data pattern to a selected track using a first write current value having a selected magnitude and subsequently reading the data pattern from the selected track while recording the number of hard errors for the first write current value, further comprising the steps of:
   at such time that a read error is detected.
      rereading at least a portion of the selected track associated with the read error: and
      classifying the read error as a hard error when the read error reoccurs over a plurality of rotations of the disc:
   writing a predetermined data pattern to a selected track using a second write current value having a selected magnitude different from the magnitude of the first write current value and subsequently reading the data pattern from the selected track while recording the number of hard errors for the second write current value, further comprising the steps of:
   at such time that a read error is detected,
      rereading at least a portion of the selected track associated with the read error; and
      classifying the read error as a hard error when the read error reoccurs over a plurality of rotations of the disc;
   selecting an optimal write current value by comparing the number of hard errors for the first write current value to the number of hard errors for the second write current value, the optimal write current value comprising the write current value having the fewest hard errors; and
   storing the optimal write current value in the disc drive and, thereafter, using the optimal write current value during write operations;
   wherein at such time that the number of hard errors for the first write current value equals the number of hard errors for the second write current value, the optimum write current value is selected as the write current value having the fewest total number of read errors.

2. The method of claim 1, wherein the steps of claim 1 are performed for a plurality of locations on the disc so that an optimal write current value is selected for each of the plurality of locations on the disc.

3. The method of claim 2, wherein the plurality of locations comprise a first location at an inner diameter and a second location at an outer diameter of the disc and the method further comprising the step of interpolating between the optimal write current value at the first location and the optimal write current value at the second location to determine an optimal write current value for a selected track at a selected diameter of the disc.

4. The method of claim 2, wherein the disc drive employs the use of zone-based recording and each of the plurality of locations comprises a zone of tracks.

5. A method for optimizing a write current value in a disc drive having a disc and an actuator adjacent the disc, the actuator including a read/write transducer for writing data to the disc during a write operation and subsequently reading data from the disc during a read operation, the disc including a plurality of nominally concentric tracks, the method comprising the steps of:

identifying a plurality of write current values;

thereafter, for each of the write current values, providing test data comprising a predetermined sequence of bits;

writing the test data to at least one selected track on the disc to provide recorded data;

reading the recorded data from the disc and comparing the recorded data to the test data;

detecting read errors in the recorded data, each detected read error comprising a discrepancy between a selected portion of the recorded data and a corresponding portion of the test data;

for each detected read error, rereading the selected portion of the recorded data;

recomparing the selected portion of the recorded data to the corresponding portion of the test data; and classifying the read error as a hard error at such time that the error is repeated;

accumulating the total number of read errors and hard errors;

for the plurality of write current values, identifying the optimum write current value as the write current value having the minimum number of hard errors;

storing the optimum write current value on the disc drive; and, thereafter, using the optimum write current value to write data to the disc;

wherein at such time that two or more of the write current values have the same minimum number of hard errors, the optimum write current value is identified as the write current value having the minimum number of hard errors and the minimum number of read errors.

6. The method of claim 5, wherein the steps of claim 5 are performed for a plurality of locations on the disc so that an optimal write current value is selected for each of the plurality of locations on the disc.

7. The method of claim 6, wherein the plurality of locations comprise a first location at an inner diameter and a second location at an outer diameter of the disc and the method further comprising the step of interpolating between the optimal write current value at the first location and the optimal write current value at the second location to determine an optimal write current value for a selected track at a selected diameter of the disc.

8. The method of claim 6, wherein the disc drive employs the use of zone-based recording and each of the plurality of locations comprises a zone of tracks.

9. In a disc drive having a disc and an actuator adjacent the disc, the actuator having a read/write transducer for writing data to and reading data from concentric tracks on the disc, the disc drive further having write current control circuitry for controlling the magnitude of write current provided to the read/write transducer, the disc drive further including a read channel having error detection and correction circuitry for detecting and correcting up to a selected number of errors in the data read from the tracks, the errors comprising hard errors characterized as comprising repeatable errors and soft errors characterized as comprising non-repeatable errors, an improved method for optimizing the write current in the disc drive comprising the steps of:

(a) selecting a first location on a disc, the first location comprising a plurality of tracks on the disc;

(b) selecting an optimum write current value for the first location on the disc, comprising the steps of:

determining the number of hard errors for each of a plurality of write current values by, for each write current value, writing data to the first location using the write current value, reading data back from the first location and comparing the data written to the first location with the data read back from the first location; and selecting the optimum write current value from the plurality of write current values as the write current value having the least number of hard errors, wherein at such time that the least number of hard errors is associated with two or more write current values, selecting the optimum write current value as the write current value having the least number of hard errors and the least number of soft errors;

(c) selecting a second location on a disc, the second location comprising a plurality of tracks on the disc;

(d) selecting an optimum write current value for second location on the disc by repeating step (b) above for the second location;

(e) storing the optimum write current values for the first and second locations; and, thereafter, (f) interpolating between the optimum write current values for the first and second locations to determine an optimum write current value for writing data to a selected track on the disc during a disc drive write operation.

10. The method of claim 9, wherein the first location comprises tracks at an outer diameter of the disc and the second location comprises tracks at an inner diameter of the disc.

* * * * *

UNITED STATES PATENT AND TRADEMARK OFFICE
CERTIFICATE OF CORRECTION

PATENT NO. : 5,687,036
DATED : November 11. 1997
INVENTOR(S) : Roger Jean Kassab It is certified that error appears in the above-indentified patent and that said Letters Patent is hereby corrected as shown below:

Column 1, line 66, delete "liwrited" and insert --limited--.

Column 5, line 21, delete "Genheimer and".

Signed and Sealed this

First Day of September, 1998

BRUCE LEHMAN

*Attest:*

*Attesting Officer*          Commissioner of Patents and Trademarks